(12) United States Patent
Stollmaier et al.

(10) Patent No.: US 7,754,809 B2
(45) Date of Patent: Jul. 13, 2010

(54) SOLVENT FREE POLYURETHANE DISPERSIONS FOR HARD SURFACE COATINGS

(75) Inventors: Friederike Stollmaier, Rheunmunster (DE); Dwight D. Latham, Clute, TX (US); Michael J. Elwell, Gambsheim (FR); Debkumar Bhattacharjee, Lake Jackson, TX (US); Bedri Erdem, Midland, MI (US)

(73) Assignee: DowGlobal Technologies Inc., Midland, MI (US)

( * ) Notice: Subject to any disclaimer, the term of this patent is extended or adjusted under 35 U.S.C. 154(b) by 103 days.

(21) Appl. No.: 11/515,072

(22) Filed: Sep. 1, 2006

(65) Prior Publication Data

US 2007/0208133 A1    Sep. 6, 2007

Related U.S. Application Data

(60) Provisional application No. 60/713,964, filed on Sep. 2, 2005.

(51) Int. Cl.
 *C08G 18/08* (2006.01)

(52) U.S. Cl. .............. 524/591; 524/589; 524/501; 524/590; 524/839; 524/840

(58) Field of Classification Search ........... 524/589, 524/591
 See application file for complete search history.

(56) References Cited

U.S. PATENT DOCUMENTS

| 4,237,264 | A | 12/1980 | Noll |
| 4,408,008 | A | 10/1983 | Markusch |
| 5,538,717 | A | 7/1996 | La Poterie et al. |
| 5,569,706 | A | 10/1996 | Jacobs et al. |
| 5,804,647 | A | 9/1998 | Nachtkamp et al. |
| 6,284,836 | B1 | 9/2001 | Hassel et al. |
| 6,359,060 | B1 | 3/2002 | Schafheutle et al. |
| 6,451,908 | B1 | 9/2002 | Koonce et al. |
| 6,524,978 | B1 * | 2/2003 | Moore ................ 442/85 |
| 6,576,702 | B2 | 6/2003 | Anderle et al. |
| 6,599,977 | B1 | 7/2003 | Hesselmans et al. |
| 6,720,385 | B2 * | 4/2004 | Tabor et al. ........... 524/591 |
| 6,765,056 | B2 * | 7/2004 | Hobel et al. .......... 524/591 |
| 2002/0004553 | A1 | 1/2002 | Temme et al. |
| 2003/0162892 | A1 | 8/2003 | Maier et al. |
| 2004/0204559 | A1 | 10/2004 | Melchiors et al. |
| 2005/0043467 | A1 | 2/2005 | Bruchmann et al. |
| 2005/0176874 | A1 * | 8/2005 | Panades et al. ........ 524/556 |

FOREIGN PATENT DOCUMENTS

| EP | 0792899 | 9/1997 |
| GB | 2386898 A | 10/2003 |
| WO | WO-2005/023947 A1 | 3/2005 |

* cited by examiner

*Primary Examiner*—Marc S. Zimmer
*Assistant Examiner*—Noah Frank

(57) ABSTRACT

The invention relates to polyurethane dispersions which develop high hardness and form coating films at room temperature. The dispersions are prepared from prepolymers containing prepolymers containing a polyol or polyol blend having specified equivalent weight and polyisocyanate to polyol molar ratio.

21 Claims, 2 Drawing Sheets

Fig 1: DMTA of Ex 5
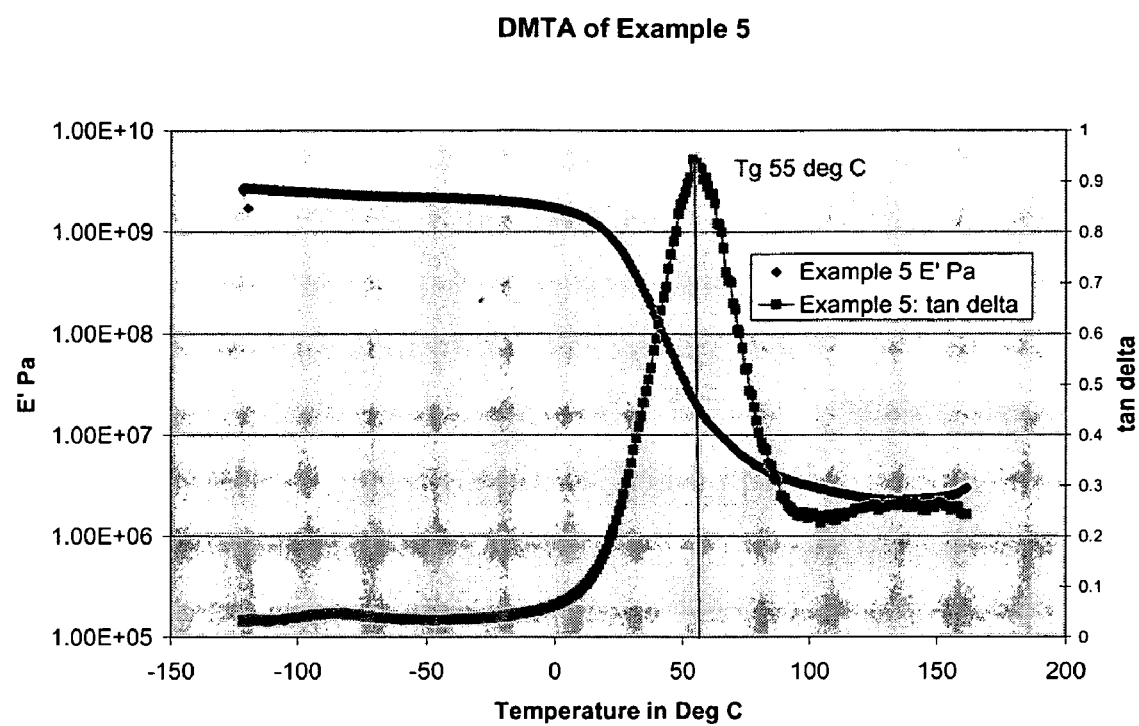

Fig 2: DMTA of Ex 8.
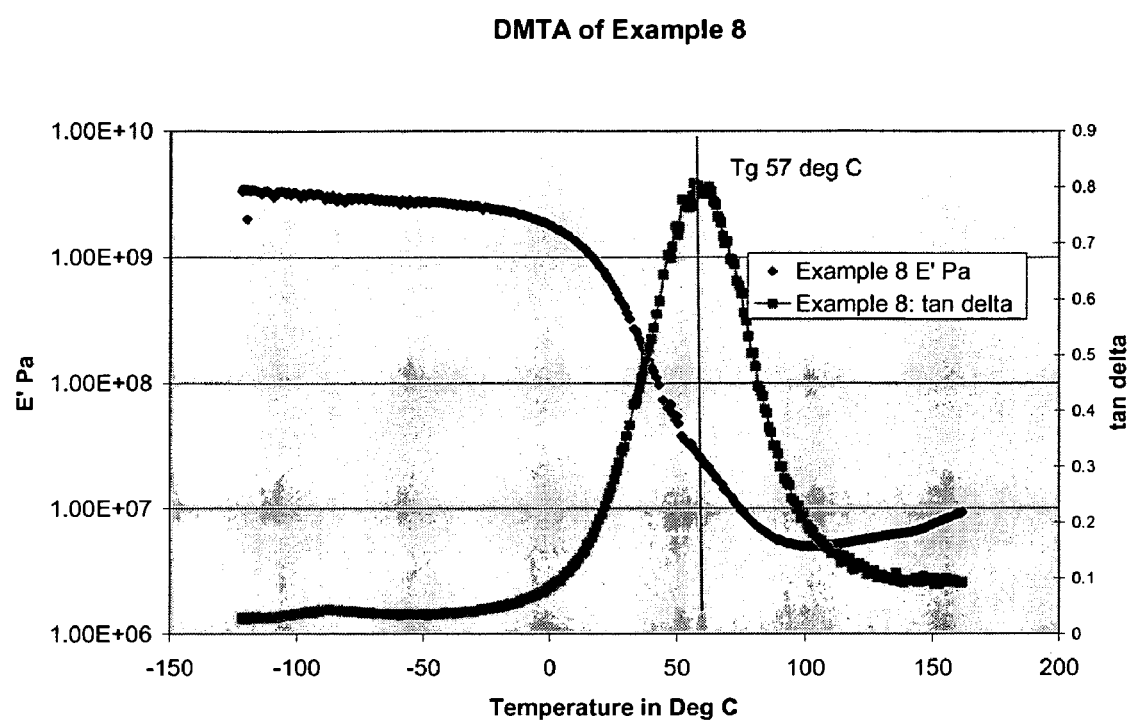

SOLVENT FREE POLYURETHANE DISPERSIONS FOR HARD SURFACE COATINGS

This application claims the benefit of U.S. Provisional Application No. 60/713,964, filed Sep. 2, 2005.

FIELD OF THE INVENTION

This invention relates to solvent free polyurethane dispersions and compositions which form films at ambient temperatures and provide for coatings with high hardness.

BACKGROUND OF THE INVENTION

Coatings for hard and soft surfaces are important for the protection of the surface and can add to the aesthetic appeal to natural surfaces, such as wood. Concerns about emissions of volatile organic compounds (VOCs) along with stricter legislation on VOCs have led to an increased focus on the use of water based systems for coating applications. Water based systems offer the additional advantages as they are easier to use than solvent based coatings.

Polyurethane dispersions (PUDs) may be used for a wide range of commercial applications, such as coatings for textile fabrics, plastics, wood, glass fibers and metals. The production of polyurethane-urea dispersions is known, as exemplified in U.S. Pat. Nos. 4,237,264; 4,408,008; 5,569,706; U.S. Patent Publications 2004204559; 2005004367; GB Patent Publication 2386898 and WO Publication 2005023947.

Regardless of the property levels of coatings prepared from commercial PUDs, there continues to be a need to improve the coating properties of PUDs used in hard coatings for surfaces, such as wood. It as an object of the present invention to provide aqueous PUDs for hard surface coating which are capable of forming a film at ambient temperature without the need for a coalescing solvent. In addition, the aqueous PUDs give a hard, solvent resistant coating.

SUMMARY OF THE INVENTION

In one aspect, the present invention is a solvent free-aqueous polyurethane dispersion which forms a film at ambient temperature wherein the polyurethane solids in the dispersion produce a hardness of equal to or greater than 95 Persoz.

In another aspect, the present invention is an aqueous polyurethane dispersion containing polyurethane solids wherein the polyurethane solids are a polyurethane prepolymer prepared by reaction of (a) a polyol or polyol blend having a mean average equivalent weight from 200 to 480;
(b) at least one polyisocyanate;
(c) optionally additional stabilizers; and
(d) optionally chain extenders;

wherein the prepolymers have an isocyanate (NCO) content of from 8 to 13 weight percent and the polyisocyanate to polyol molar ratio is from 2.0 to 3.0.

In a further aspect, the present invention is a coating prepared from the above-described PUDs.

FIG. 1 shows the dynamic mechanical response as a function of temperature of the polymer film formed by the dispersions of Example 5.

FIG. 2 shows the dynamic mechanical response as a function of temperature of the polymer film formed by the dispersions of Example 8.

DETAILED DESCRIPTION

The polyurethane prepolymers in making the PUDs include a polyisocyanate component and an isocyanate reactive component also known as an active hydrogen containing material or polyol. The term polyurethane includes polymers containing linkages known to those in the art associated with the formation of a polyurethane, such as urea or polyureas, allophonate, biuret, etc.

The PUDs of the present invention form a film at ambient temperatures without the need for coalescing agents. Outdoor ambient temperatures include from 5 to 45° C. and for indoor applications where the temperature is generally from 15 to 25° C. The dispersion can be applied at higher temperatures, however; this would increase the cost for use of such PUDs. The coatings based on PUDs of the present invention have a hardness of 90 seconds or greater based on the Persoz test. Preferably the coatings have a hardness of 95 seconds or greater and more preferably have a hardness of 100 seconds or greater.

The polyisocyanate component of the prepolymer formulations of the present invention can be advantageously selected from organic polyisocyanates, modified polyisocyanates, isocyanate-based prepolymers, and mixtures thereof. These can include aliphatic, aromatic and cycloaliphatic isocyanates. Such polyisocyanates include 2,4- and 2,6-toluenediisocyanate and the corresponding isomeric mixtures; 4,4'-, 2,4'- and 2,2'-diphenyl-methanediisocyanate and the corresponding isomeric mixtures; mixtures of 4,4'-, 2,4'- and 2,2'-diphenylmethanediisocyanates and polyphenyl polymethylene polyisocyanates PMDI; and mixtures of PMDI and toluene diisocyanates. Also useful for preparing the polyurethanes of the present invention are aliphatic and cycloaliphatic isocyanate compounds such as 1,6-hexamethylene-diisocyanate; isophorone diisocyanate, 1-isocyanato-3,5,5-trimethyl-1-3-isocyanatomethyl-cyclohexane; 2,4- and 2,6-hexahydrotoluene-diisocyanate, the isomeric mixtures; 4,4'-, 2,2'- and 2,4'-dicyclohexylmethanediisocyanate, the isomeric mixtures 1,3-tetramethylene xylene diisocyanate, norbane diisocyanate and 1,3- and 1,4-(bisisocyanatomethyl) cyclohexane can also be used with the present invention.

Also advantageously used for the polyisocyanate component of the formulations of the present invention are the so-called modified multifunctional isocyanates, i.e., products which are obtained through chemical reactions of the above diisocyanates and/or polyisocyanates. Exemplary are polyisocyanates containing esters, ureas, biurets, allophanates, carbodiimides and/or uretonimines; isocyanurate and/or urethane group containing diisocyanates or polyisocyanates.

Active hydrogen containing compounds most commonly used in polyurethane production are those compounds having at least two hydroxyl groups or amine groups. Those compounds are referred to herein as polyols. Representatives of suitable polyols are generally known and are described in such publications as High Polymers, Vol. XVI, "Polyurethanes, Chemistry and Technology" by Saunders and Frisch, Interscience Publishers, New York, Vol. I, pp. 32-42, 44-54 (1962) and Vol. II, pp. 5-6, 198-199 (1964); Organic Polymer Chemistry by K. J. Saunders, Chapman and Hall, London, pp. 323-325 (1973); and Developments in Polyurethanes, Vol. I, J. M. Burst, ed., Applied Science Publishers, pp. 1-76 (1978). However, any active hydrogen containing compound can be used with the present invention. Examples of such materials include those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols.

The polyether polyols include those obtained by the alkoxylation of suitable starting molecules with an alkylene oxide, such as ethylene (EO), propylene (PO), butylene oxide (BO), or a mixture thereof. Examples of initiator molecules include water, ammonia, aniline or polyhydric alcohols such as dihydric alcohols having a molecular weight of 62-399, especially the alkane polyols such as ethylene glycol, propylene glycol, hexamethylene diol, glycerol, trimethylol propane or trimethylol ethane, or the low molecular weight alcohols containing ether groups such as diethylene glycol, triethylene glycol, dipropylene glycol, tripropylene glycol or butylene glycols. Other commonly used initiators include pentaerythritol, xylitol, arabitol, sorbitol, sucrose, mannitol, bis-phenol A and the like. Other initiators include linear and cyclic amine compounds which may also contain a tertiary amine, such as ethanoldiamine, triethanoldiamine, and various isomers of toluene diamine, methyldiphenylamine, aminoethylpiperazine, ethylenediamine, N-methyl-1,2-ethanediamine, N-methyl-1,3-propanediamine, N,N-dimethyl-1,3-diaminopropane, N,N-dimethylethanolamine, 3,3-diamino-N-methylpropylamine, aminopropyl-imidazole and mixtures thereof. Preferred are poly(propylene oxide) polyols and poly(oxypropylene-oxyethylene) polyols is used. These polyols are conventional materials prepared by conventional methods. Catalysis for this polymerization can be either anionic or cationic, with catalysts such as KOH, CsOH, boron trifluoride, or a double cyanide complex (DMC) catalyst such as zinc hexacyanocobaltate or quaternary phosphazenium compound. In the case of alkaline catalysts, these alkaline catalysts are preferably removed from the polyol at the end of production by a proper finishing step, such as coalescence, magnesium silicate separation or acid neutralization.

Other polyether polyols include the poly(tetramethylene oxide) polyols, also known as poly(oxytetramethylene)glycol, that are commercially available as diols. These polyols are prepared from the cationic ring-opening of tetrahydrofuran and termination with water as described in Dreyfuss, P. and M. P. Dreyfuss, Adv. Chem. Series, 91, 335 (1969).

The polyether polyols include poly(oxypropylene)glycols, triols, tetrols and hexols and any of these that are capped with ethylene oxide. These polyols also include poly(oxypropyleneoxyethylene)polyols. The oxyethylene content should preferably comprise less than about 80 weight percent of the total polyol weight and more preferably less than about 40 weight percent. The ethylene oxide, when used, can be incorporated in any way along the polymer chain, for example, as internal blocks, terminal blocks, or randomly distributed blocks, or any combination thereof.

Polyether polyols based on an aromatic polyamine include those initiated, for example, with 2,3-, 3,4-, 2,4- and 2,6-tolulenediamine, 4,4', 2,4'- and 2,2'-diaminodiphenylmethane, polyphenyl-polymethylene-polyamines, 1,2-, 1,3- and 1,4-phenylenediamine and mixtures thereof. Such polyols are disclosed, for example in U.S. Pat. Nos. 5,895,793 and 5,962,2542, the disclosures of which are incorporated by reference.

Illustrative polyester polyols may be prepared from organic dicarboxylic acids having from 2 to 12 carbon atoms, preferably aromatic dicarboxylic acids having from 8 to 12 carbon atoms, and polyhydric alcohols, preferably diols, having from 2 to 12, preferably from 2 to 8 and more preferably 2 to 6 carbon atoms. Examples of dicarboxylic acids are succinic acid, glutaric acid, adipic acid, suberic acid, azelaic acid, sebacic acid, decanedicarboxylic acid, malonic acid, pimelic acid, 2-methyl-1,6-hexanoic acid, dodecanedioic acid, maleic acid and fumaric acid. Preferred aromatic dicarboxylic acids are phthalic acid, isophthalic acid, terephthalic acid and isomers of naphthalene-dicarboxylic acids. Such acids may be used individually or as mixtures. Examples of dihydric and polyhydric alcohols include ethanediol, diethylene glycol, triethylene glycol, 1,2- and 1,3-propanediol, dipropylene glycol, 1,4-butanediol and other butanediols, 1,5-pentanediol and other pentanediols, 1,6-hexanediol, 1,10-decanediol, glycerol, and trimethylolpropane. Illustrative of the polyester polyols are poly(hexanediol adipate), poly(butylene glycol adipate), poly(ethylene glycol adipate), poly(diethylene glycol adipate), poly(hexanediol oxalate), poly(ethylene glycol sebecate), and the like.

While the polyester polyols can be prepared from substantially pure reactants materials, more complex ingredients can be used, such as the side-stream, waste or scrap residues from the manufacture of phtalic acid, terephthalic acid, dimethyl terephthalate, polyethylene terephthalate and the like. Other source is the recycled PET (polyethylene terephthalate). After transesterification or esterification the reaction products can optionally be reacted with an alkylene oxide.

Another class of polyesters which may be used are polylactone polyols. Such polyols are prepared by the reaction of a lactone monomer; illustrative of which is δ-valerolactone, ε-caprolactone, ε-methyl-ε-caprolactone, ξ-enantholactone, and the like; with an initiator that has active hydrogen-containing groups; illustrative of which is ethylene glycol, diethylene glycol, propanediols, 1,4-butanediol, 1,6-hexanediol, trimethylolpropane, and the like. The production of such polyols is known in the art; see, for example, U.S. Pat. Nos. 3,169,945, 3,248,417, 3,021,309 and 3,021,317. The preferred lactone polyols are the di-, tri-, and tetra-hydroxyl functional ε-caprolactone polyols known as polycaprolactone polyols.

Polycarbonate containing hydroxyl groups include those known per se such as the products obtained from the reaction of diols such as propanediol-(1,3), butanediols-(1,4) and/or hexanediol-(1,6), diethylene glycol, triethylene glycol or tetraethylene glycol with diarylcarbonates, e.g. diphenylcarbonate or phosgene.

Illustrative of the various other polyols suitable are the styrene/allyl alcohol copolymers; alkoxylated adducts of dimethylol dicyclopentadiene; vinyl chloride/vinyl acetate/vinyl alcohol copolymers; vinyl chloride/vinyl acetate/hydroxypropyl acrylate copolymers, copolymers of 2-hydroxyethylacrylate, ethyl acrylate, and/or butyl acrylate or 2-ethylhexyl acrylate; copolymers of hydroxypropyl acrylate, ethyl acrylate, and/or butyl acrylate or 2-ethylhexylacrylate, and the like.

Copolymer polyols containing polymerized styrene and acrylonitrile fillers as well as polyols derived from natural seed oils and fatty acid can also be used in the polyol formulation.

Polyamines, amine-terminated polyethers, polymercaptans and other isocyanate-reactive compounds are also suitable in the present invention. Polyisocyanate polyaddition active hydrogen containing compounds (PIPA) can be used with the present invention. PIPA compounds are typically the reaction products of TDI and triethanolamine. A process for preparing PIPA compounds can be found in, for example, U.S. Pat. No. 4,374,209, issued to Rowlands.

While not wishing to be bound by theory, the ability to obtain a hard continuous useful coating which forms a film at ambient temperatures is believed to be due to the hard mixed phase of the dispersion. The hardness is obtained by including a substantial amount of polyisocyanate in the prepolymer such that the prepolymers have an NCO content of from about 8 to about 13 weight percent and preferably from about 9 to about 12 weight percent and the polyisocyanate to polyol mole ratio is from 2.0 to 3.0 (i.e. 2.0:1 to 3.0:1). In one embodiment, when the isocyanate is MDI, the lower limit of the NCO content can be down to 7 weight percent. Generally for MDI the NCO will be less than 13, preferably less than 12, and more preferable no greater than 11 weight percent.

The polyol present in the prepolymer, which can also contribute to the hard mixed phase, is a polyol or polyol blend which has a mean equivalent weight from 200 to 480. Preferably the polyol or polyol blend has an equivalent weight from 230 to 450 and more preferably from 240 to 400 and most preferably from 250 to 380. To avoid the use of a solvent, it is preferred the polyol or polyol blend has an equivalent weight of 240 or greater. In a preferred embodiment, the polyol component is a polyol blend comprising at least one high and at least one low molecular weight polyol such that the mean average equivalent weight of the blend is as given above. The polyol blend is selected such that the difference between the equivalent weight of the low and high molecular weight polyol is greater than or equal to 50%; more preferably greater than or equal to 100%, more preferably greater than or equal to 200% and most preferably equal to or greater than 300%. By way of example, the low molecular weight polyol will have an equivalent weight of from 50 to 300. Preferably the low molecular weight polyol with have an equivalent weight from 75 to 250 and more preferably from 100 to 225. The high molecular weight polyol will have an equivalent weight of from 250 to 1500, preferably from 375 to 1250 and more preferably from 500 to 1125.

In one embodiment, the polyol blend is a blend of 2 or more polyethers. In another embodiment, the polyol blend is two or more polyether diols.

When a polyol blend is used containing a high and low molecular weight polyol, the high molecular weight polyol can be capped with from about 5 to about 25 percent ethylene oxide, and more preferably, from about 10 to about 15 percent ethylene oxide.

The dispersion containing the prepolymers will generally give a Persoz hardness of 96 seconds or greater and preferably a hardness of at least 100 seconds.

The prepolymers of the present invention can be prepared in any way known to those of ordinary skill in the art of preparing polyurethane prepolymers. Preferably the polyisocyanate and polyol component are brought together and heated under reaction conditions sufficient to prepare a polyurethane prepolymer. The stoichiometry of the prepolymer formulations of the present invention is such that the polyisocyanate is present in excess.

The prepolymer can be made in the presence of a solvent and the solvent removed before or after the production of the dispersion. If a solvent is present, is preferred the solvent is removed to give an aqueous dispersion which is essentially free of solvent. That is, the dispersion contains less than 5 percent, preferable less than 2.5 percent and more preferably less than 1 percent by weight of solvent. In a preferred embodiment the prepolymers is made in the absence of a solvent. When a solvent is used, examples of solvents which are not reactive with the isocyanate include ketones, such as acetone and butanone; ethers such as tetrahydrofuran, dioxane and dimethoxyethane, ether esters, such as methoxypropyl acetate; (cyclic) amide and ureas, such as dimethylformamide, dimethylacetamide, N,N'-dimethyl-2,5-dizapentanone; N-methylpyrrolidone; and capped glycol ethers, such as PROGLYDE™ DMM (trademark of The Dow Chemical Company). These solvents may be added at any stage of the prepolymer preparation.

Processes for making dispersions are well known in the art. The dispersions can be done by a batch process or by a continuous process. If done by a batch process, preferably, the dispersion in done by an inverse phase process wherein a small amount of water, including a small amount of anionic surfactant, is first added to a continuous prepolymer phase and mixed and then more water is added with mixing until the phase inverts.

When dispersions of the present invention are prepared by means of a continuous process, preferably they are prepared by means of a high internal phase ratio (HIPR) process. Such processes are known and are disclosed in, for Example, U.S. Pat. No. 5,539,021 to Pate, et al., and WO 98/41552 A1 to Jakubowski, et al. When prepared by either method, the resulting dispersion should have a particle size sufficient to make the dispersion stable. The dispersions of the present invention will have a particle size of from 0.9 to about 0.05, preferably from about 0.5 to about 0.07 and even more preferably, from about 0.4 to about 0.10 microns. Most preferably, the particle size of the dispersions of the present invention is about 0.15 microns.

Surfactants can be useful for preparing a stable dispersion of the present invention, and/or for preparing a stable froth. Surfactants useful for preparing a stable dispersion in the practice of the present invention can be cationic surfactants, anionic surfactants, zwitterionic or a non-ionic surfactants. Examples of anionic surfactants include sulfonates, carboxylates, and phosphates. Examples of cationic surfactants include quaternary amines. Examples of non-ionic surfactants include block copolymers containing ethylene oxide and silicone surfactants, such as ethoxylated alcohol, ethoxylated fatty acid, sorbitan derivative, lanolin derivative, ethoxylated nonyl phenol or a alkoxylated polysiloxane. Furthermore, the surfactants can be either external surfactants or internal surfactants. External surfactants are surfactants which do not become chemically reacted into the polymer during dispersion preparation. Examples of external surfactants useful herein include salts of dodecyl benzene sulfonic acid, and lauryl sulfonic acid salt. Internal surfactants are surfactants which do become chemically reacted into the polymer during dispersion preparation. An example of an internal surfactant useful herein includes anionic molecules such as 2,2-dimethylol propionic acid and dihydroxy and amino sulfate and sulfonate their salts, quaternized ammonium salts, and nonionic hydrophilic species, such polyethylene oxide monols and polyols. These hydrophilic ionic and nonionic moieties may be built into on the polymer backbone. A surfactant can be included in a formulation of the present invention in an amount ranging from about 0.01 to about 8 parts per 100 parts by weight of polyurethane component. When a polyethylene oxide polyol is used as a surfactant, this polyol is considered part of the polyol mixture when calculating the polyisocyanate to polyol ratio.

A monol can be included in the prepolymer formulation, the monol is preferably a mono-functional hydrophilic polyether. The monols can be incorporated into the prepolymer as a means of modifying the properties of the latex and improving ease of emulsion formation. When present, the monol is present in amount of from 0.1 to about 15 weight percent of the prepolymer formulation, preferably from 2 to about 5 weight percent of the prepolymer formulation.

It is preferred the prepolymers are extended with a chain extender. Any chain extender known to be useful to those of ordinary skill in the art of preparing polyurethanes can be used with the present invention. Such chain extenders typically have a molecular weight of about 30 to about 500 and have at least two active hydrogen containing groups. Polyamines are a preferred class of chain extenders. Other materials, particularly water, can function to extend chain length and so are chain extenders for purposes of the present invention. It is particularly preferred that the chain extender is water or a mixture of water and an amine such as, for example, aminated polypropylene glycols such as Jeffamine D-400 and others from Huntsman Chemical Company, amino ethyl piperazine, 2-methyl piperazine, 1,5-diamino-3-methyl-pentane, isophorone diamine, ethylene diamine, diethylene triamine, triethylene tetramine, triethylene pentamine, ethanol amine, lysine in any of its stereoisomeric forms and salts thereof, hexane diamine, hydrazine and piperazine. In the practice of the present invention, the chain extender is often used as solution of chain extender in water.

It is particularly preferred to include a chain extender, such as an aminated polypropylene glycol, when the mean average equivalent weight of the polyol or polyol blend is less than 260.

While, the chain extender of the present invention can be water, preferably it is a diamine. To the extent that a chain extender other than water is used in the formulations of the present invention, preferably it is used at an amount such that the equivalents of active hydrogens of the chain extender is less than about 90 percent of the isocyanate equivalents represented by the prepolymer NCO content. Even more preferably, the chain extender is present at an amount such that the equivalents of active hydrogens of the chain extender is from about 10 to about 60 percent of the isocyanate equivalents represented by the prepolymer NCO content.

The dispersions will generally have a solids content of from 30 to 60 weight percent. Films will not necessarily be prepared from dispersions having this level of solids. While the dispersion themselves will be stored and shipped at a high solids content as possible to minimize storage volume and shipping costs, the dispersion can be diluted prior to final use.

The dispersions may contain further auxiliaries and additives, such as, for example, inorganic and organic pigments, dyes, leveling agents, viscosity regulators, natural and synthetic waxes, anti-foaming agents, matting agents and the like.

The dispersions of the present invention are useful in coatings for hard surfaces, particularly as wood coatings. The PUDs may be applied by conventional methods such as painting, spraying, flow-coating, transfer-coating, roller coating, brushing, dipping spreading, curtain coating etc. The dispersions can be puddled or pooled on a substrate and then spread over the substrate using a brush or other spreading means. Spraying includes atomizing the PUD and ejecting the atomized material onto the substrate.

The PUDs are preferably applied at ambient temperatures as described above. Drying of the products obtained by the various applications of the PUDs can be carried out at room temperature or at elevated temperature.

The following examples are provided to illustrate the present invention. The examples are not intended to limit the scope of the present invention and should not be so interpreted. All percentages are by weight unless otherwise noted.

EXAMPLES

Raw Materials

Tergitol L61 is 2000 molecular weight polyoxypropylene diol capped with 12% ethylene oxide; available from The Dow Chemical Company.

Polyglycol P425 is a polyoxypropylene diol with a molecular weight of 425 available from The Dow Chemical Company.

Polyethyleneglycol 1000 is a polyethylene glycol with a molecular weight of 1000.

MPEG 950 is methoxypolyethyleneglycol with a molecular weight of 950.

MDI used was 98% 4,4' diphenylmethane diisocyanate available from The Dow Chemical Company.

Jeffamine D230 is a 230 MW polyoxypropylene diamine available from Huntsman.

Examples 1-9

A prepolymer is prepared by heating a mixture of Tergitol L61, Polyglycol P425, Polyethylene glycol 1000 and MPEG 950 to 50° C. in a weight ratio as given in Table 1. To this mixture an amount of MDI given is added, which is also heated to 50° C. To the samples, approximately 80 ppm benzoylchloride is added to neutralize base in the polyols. The reaction mixture is heated at 80° C. for 4 hours.

Dispersions are prepared by adding 3 parts (dry based on 100 parts prepolymer) of a sodiumdodecyl benzyl sulfonate surfactant with a concentration of 22% to the reaction mixture using a high shear stirrer at 3000 rpm. Additional water is added until a phase inversion is observed. Then the dispersion is further diluted with water to between 45 and 65% solids. During the dilution step Jeffamine D230 in the amount given in Table 1.

TABLE 1

| | Tergitol L61 | P425 | PEG 1000 | MPEG 950 | MDI | Jeffamine D230 |
|---|---|---|---|---|---|---|
| Ex 1 | 10 | 36.2 | 4.5 | 2 | 47.4 | 6.5 |
| Ex 2 | 10 | 36.2 | 4.5 | 2 | 47.4 | 13.0 |
| Ex 3 | 15 | 33.6 | 4.5 | 2 | 44.9 | 0.0 |
| Ex 4 | 15 | 33.5 | 4.5 | 2 | 44.9 | 6.0 |
| Ex 5 | 20 | 26 | 4 | 2 | 48 | 6 |
| Ex 6 | 20 | 26 | 4 | 2 | 48 | 8 |
| Ex 7 | 20 | 26 | 4 | 2 | 48 | 10.7 |
| Ex 8 | 25 | 21 | 4 | 2 | 48 | 6 |
| Ex 9 | 21.5 | 26 | 3.5 | 2 | 47 | 6 |

Persoz Hardness

To measure the Persoz hardness, all films were drawn down with a draw down bar at a wet film thickness of 400 μm onto a phosphated steel panel at room temperature. They were dried at room temperature. All examples formed a defect free film. The hardness was measured with a Persoz pendulum (Byk Chemie.). The time in sec for the pendulum dampening from 12 degrees to 3 degrees is recorded. The values after 2 days drying at room temperature are given in Table 2.

TABLE 2

| | Persoz Hardness [sec] |
|---|---|
| Ex 1 | 160 |
| Ex 2 | 150 |
| Ex 3 | 110 |
| Ex 4 | 100 |
| Ex 5 | 130 |
| Ex 6 | 130 |
| Ex 7 | 120 |
| Ex 8 | 110 |
| Ex 9 | 120 |

Modulus and Glass Transition Temperature

The high hardness manifests itself in a high glass transition temperature (Tg) as determined by dynamic mechanical thermal analysis (DMTA). The Tg is given by the tan delta curve as shown in FIGS. 1 and 2. Below the Tg the polymer is in a glassy state and shows a high elastic modulus E'. The films of Ex 5 and Ex 8 are shown. Both polymers have a Tg above 50° C. Dynamic mechanical thermal analysis data are obtained over the temperature range −120° C. to 160° C. employing a TA Instruments RSA† III analyzer operating at a frequency of 1 Hz and a heating rate of 5° C./min. A torsion-rectangular mode fixture geometry is used for small dog-bone samples (15 mm×5 mm), which are cut from drawn down thin films (200 μm thickness). Dynamic flexural modulus (E') and mechanical damping (tan δ) are obtained as a function of temperature

COMPARATIVE EXAMPLES

Weight ratios of comparative examples are given in Table 3. The polyol of comparative examples 1 and 2 have an equivalent weight below 240 and comparative 3 lacks a chain extender with a polyol having an equivalent weight of less than 260. Comparative example 4, with a low NCO content produced a film, but not of the desired harness. For comparative examples 5 and 6, the polyisocyanate to polyol mole ratio is greater than 3.0.

TABLE 3

Weight ratios of competitive samples

| | Tergitol L61 | P425 | PEG 1000 | MPEG 950 | MDI | Jeffamine D230 |
|---|---|---|---|---|---|---|
| Comp Ex 1 | 5 | 38.6 | 4.5 | 2 | 49.8 | 0 |
| Comp Ex 2 | 5 | 38.6 | 4.5 | 2 | 49.8 | 6.9 |
| Comp Ex 3 | 10 | 36.2 | 4.5 | 2 | 47.4 | 0 |
| Comp Ex 4 | 20 | 31.1 | 4.5 | 2 | 42.4 | 0 |
| Comp Ex 5 | 40 | 6 | 4 | 2 | 48 | 6 |
| Comp Ex 6 | 45 | 1 | 4 | 2 | 48 | 6 |

Persoz Hardness Comparative Examples 1-5

The samples were applied on a metal plate at a wet thickness of 400 micrometer as described above. The results are shown in Table 4. The comparative examples do either not form a film at room temperature and would require solvents for application or they lead to a very low hardness which is insufficient when used in coatings for wood applications.

TABLE 4

| | Persoz hardness [sec] |
|---|---|
| Comp Ex 1 | No RT film |
| Comp Ex 2 | No RT film |
| Comp Ex 3 | No RT film |
| Comp Ex 4 | 60 |
| Comp Ex 5 | No RT film |
| Comp Ex 6 | No RT film |

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. An aqueous polyurethane dispersion containing polyurethane solids and a non-aqueous, organic solvent content of less than 5 weight percent wherein the polyurethane solids are obtained from a polyurethane prepolymer prepared by reacting
   (a) a polyol or polyol blend having a mean average equivalent weight of 240 to 480, and
   (b) at least one polyisocyanate
   (c) optionally additional stabilizers; and
   (d) optionally chain extenders
wherein the prepolymer has an isocyanate (NCO) content of from 8 to 13 weight percent and the polyisocyanate to polyol molar ratio is from 2.0:1 to 3.0:1; with the proviso when the equivalent weight of the polyol or polyol blend is less than 260, a chain extender is present.

2. The dispersion of claim 1 wherein the solids content is from 40 to 60 weight percent.

3. The dispersion of claims 1 wherein the polyisocyanate is an aliphatic isocyanate.

4. The dispersion of claim 3 wherein the isocyanate is 1,6-hexamethylene-diisocyanate; isophorone diisocyanate, 1,3-, 1,4-(bisisocyanatomethyl)cyclohexane or a mixture thereof.

5. The dispersion of claim 1 wherein the polyisocyanate is an aromatic isocyanate.

6. The dispersion of claim 5 wherein the isocyanate is 2,4- or 2,-6-toluenediisocyanate, 4,4', 2,4' or 2,2'-diphenylmethanediisocyanate or a mixture of such isomers, polyphenyl polymethylene polyisocyanate or a mixture thereof.

7. The dispersion of claim 6 wherein the isocyanate diphenylmethanediisocyanate.

8. The dispersion of claim 1 wherein the prepolymer and dispersion are prepared in the absence of an organic solvent.

9. The dispersion of claim 1 wherein the polyol or polyol blend has an average mean equivalent weight of 240 to 450.

10. This dispersion of claim 9 wherein the polyol or polyol blend has an average mean equivalent weight of 240 to 400.

11. The dispersion of claim 1 wherein (a) is a blend of two or more polyols where at least a first polyol has an equivalent weight of from 50 to 300 and at least one second polyol having an equivalent weight of from 250 to 1500.

12. The dispersion of claim 1 wherein the first and second polyols are diols.

13. The dispersion of claim 12 wherein the first polyol is a polyether polyol.

14. The dispersion of claim 11 wherein the second polyol is a polyether.

15. The dispersion of claim 14 wherein the polyol is a poly(propylene oxide) or a poly(propylene oxide) terminated with 5 to 25 weight percent ethylene oxide.

16. The dispersion of claim 1 wherein the prepolymer is made in the presence of a solvent and the solvent is substantially removed prior to dispersion of the prepolymer in water.

17. The dispersion of claim 1 wherein the dispersion is made in a continuous process.

18. The use of the polyurethane dispersion of claim 1 for a coating on a hard surface.

19. The use of claim 18 wherein the hard surface is wood.

20. The dispersion of claim 1 wherein the polyurethane dispersion forms a film at ambient temperature and produces a coating on a hard surface with a Persoz hardness of at least 95 seconds.

21. An aqueous polyurethane dispersion containing polyurethane solids and a non-aqueous, organic solvent content of less than 5 weight percent wherein the polyurethane solids are obtained from a polyurethane prepolymer prepared by reacting (a) a polyol or polyol blend having a mean average equivalent weight of 240 to 480, and (b) at least one polyisocyanate selected from 4,4', 2,4' or 2,2'-diphenylmethanediisocyanate or a mixture of such isomers;

(c) optionally additional stabilizers; and (d) optionally chain extenders wherein the prepolymer has an isocyanate (NCO) content of from 7 to 13 weight percent and the polyisocyanate to polyol molar ratio is from 2.0:1 to 3.0:1; with the proviso when the equivalent weight of the polyol or polyol blend is less than 260, a chain extender is present.

* * * * *